United States Patent
Samii et al.

(10) Patent No.: US 8,372,545 B2
(45) Date of Patent: Feb. 12, 2013

(54) SEPARATOR FOR NON-AQUEOUS LITHIUM-ION BATTERY

(75) Inventors: Garrin Samii, Laguna Hills, CA (US); Abbas Samii, Belmont, MA (US); Banafsheh Behnam, Cambridge, MA (US); David Veno, Woburn, MA (US)

(73) Assignee: Advanced Membrane Systems, Inc., North Billerica, MA (US)

( * ) Notice: Subject to any disclaimer, the term of this patent is extended or adjusted under 35 U.S.C. 154(b) by 0 days.

(21) Appl. No.: 13/240,967

(22) Filed: Sep. 22, 2011

(65) Prior Publication Data

US 2012/0094167 A1    Apr. 19, 2012

Related U.S. Application Data

(63) Continuation-in-part of application No. 11/682,079, filed on Mar. 5, 2007.

(51) Int. Cl.
*H01M 2/16* (2006.01)
(52) U.S. Cl. ......... 429/252; 429/247; 429/249; 429/254
(58) Field of Classification Search .................. 429/252, 429/247, 249, 254
See application file for complete search history.

(56) References Cited

U.S. PATENT DOCUMENTS

| | | | |
|---|---|---|---|
| 3,351,495 A | 11/1967 | Larsen et al. | |
| 4,287,276 A | 9/1981 | Lundquist, Jr. et al. | |
| 4,650,730 A | 3/1987 | Lundquist et al. | |
| 5,079,287 A | 1/1992 | Takeshi et al. | |
| 5,565,281 A | 10/1996 | Yu et al. | |
| 5,641,565 A | 6/1997 | Sogo | |
| 5,738,955 A | 4/1998 | Gardner et al. | |
| 5,922,492 A | 7/1999 | Takita et al. | |
| 6,096,213 A | 8/2000 | Radovanovic et al. | |
| 6,180,282 B1 | 1/2001 | Nishida et al. | |
| 6,372,379 B1 | 4/2002 | Samii et al. | |
| 6,514,333 B1 | 2/2003 | Yuan et al. | |
| 6,566,012 B1 | 5/2003 | Takita et al. | |
| 6,949,315 B1 | 9/2005 | Samii et al. | |
| 7,662,518 B1 | 2/2010 | Samii et al. | |
| 2003/0219587 A1 | 11/2003 | Pekala | |
| 2006/0007765 A1 | 1/2006 | Watanabe et al. | |
| 2006/0046138 A1 * | 3/2006 | Hennige et al. | 429/142 |
| 2008/0096102 A1 * | 4/2008 | Hatayama et al. | 429/122 |

FOREIGN PATENT DOCUMENTS

| | | |
|---|---|---|
| CA | 2611275 | 12/2006 |
| WO | WO 2006/047114 | 5/2006 |
| WO | WO 2008016174 A1 * | 2/2008 |

* cited by examiner

*Primary Examiner* — Basia Ridley
*Assistant Examiner* — Sean P Cullen
(74) *Attorney, Agent, or Firm* — Verrill Dana, LLP; Chris A. Caseiro

(57) ABSTRACT

A method for manufacturing battery separators for use in a lithium-ion battery containing non-aqueous electrolytes, producing batteries being resistant to thermal runaway and explosion, includes the steps of preparing a dryblend comprising two UHMW Polyethylenes and Calcined Kaolin, feeding said dry-blend into an extruder, melt-kneading said dry blend in the extruder while feeding mineral oil, making a solution from a die into the form of a sheet, using casting rolls, thereby cooling the solution down, producing a thick gel sheet, stretching the gel sheet in both machine and transverse directions, producing a 20 micron thick gel sheet containing oil thereby, extracting the oil by use of a solvent and drying the film, heat-setting the film and producing a microporous membrane.

6 Claims, 6 Drawing Sheets

SEPARATOR FOR NON-AQUEOUS LITHIUM-ION BATTERY

This application is a continuation in part of application Ser. No. 11/682,079, filed on Mar. 5, 2007, and claims priority based on that prior application.

FIELD OF THE DEVICE AND METHOD

The microporous membrane of this device and method is particularly developed for the usage in non-aqueous lithium ion cells, although they also have usage in filtration, electrolysis, printing media, breathable house wrap and any application that requires microporous membranes with high air permeability with Gurley between 5 to 15 seconds/10 cc.

SUMMARY OF THE PRESENT DEVICE AND METHOD

It is an object of the present device and method to provide a battery separator for use in a lithium-ion battery having a non-aqueous electrolyte which provides enhanced safety in regard to thermal runaway.

It is a further object to do so with a device and method which resists fire and explosion, especially when subjected to puncture trauma of the battery.

It is a still further aspect of this device and method to provide a lithium-ion battery which allows the driver of an automobile sufficient time to abandon the vehicle and get far away from the vehicle after an accident which might cause trauma or rupture to the battery.

In accordance with a first aspect of this device and method In accordance with one aspect of the present method for manufacturing a battery separator for use in a lithium-ion battery containing a non-aqueous electrolyte, the battery separator therefore being resistant to thermal runaway, fire, and explosion, the method comprising the steps of preparing a dry-blend comprising 45% by weight of a UHMW polyethylene having average Mw of $1 \times 10^6$, 5% by weight by weight of UHMW polyethylene having average Mw of $5 \times 10^6$ and 50% by weight Calcined Kaolin with density of 2.6.

In accordance with a second aspect of the method, further steps include feeding the dry-blend into an extruder.

In accordance with a third aspect of the method, further steps including using temperatures between 200-240° C. melt-kneading the dry blend in the extruder while feeding 60% by weight of a plasticizer such as liquid paraffin or mineral oil thereby making a solution.

In accordance with a fourth aspect of the method, further steps include extruding the solution from a T-die into the form of a sheet.

In accordance with a fifth aspect of the method, further steps include cooling said solution down using a two-roll casting roll, thereby producing a 30 mil (0.750 mm) thick gel sheet.

In accordance with a sixth aspect of the method, further steps include wet-stretching the gel sheet 6 times in both machine and transverse directions at 120-130 degrees C. producing a 20 micron thick gel sheet containing liquid paraffin or mineral oil thereby.

In accordance with a seventh aspect of the method, further steps include extracting the liquid paraffin or mineral oil by use of a solvent and drying the film.

In accordance with an eighth aspect of the method, the further steps include heat-setting the film at 125-130 degrees C., producing a microporous membrane thereby.

In accordance with a ninth aspect of the method a further step includes using a portion of said microporous membrane as a battery separator in the lithium-ion battery.

In accordance with a tenth aspect of the method a further step dry blend mixture comprises 24% by weight of a UHMW polyethylene having average Mw of $1 \times 10^6$, 5% by weight of a UHMW polyethylene having Mw of $3 \times 10^6$ and 50% by weight of Silane coated Calcined Kaolin.

In accordance with an eleventh aspect of the method the dry blend mixture comprises 25% by weight of a UHMW polyethylene having Mw of $1 \times 10^6$, and 75% by weight silane coated calcined kaolin.

In accordance with a twelfth aspect of the method the dry blend mixture comprises 45% by weight of a UHMW polyethylene having Mw of $1 \times 10^6$, 5% by weight of a UHMW polyethylene having Mw of $3 \times 10^6$ and 50% by weight silane-coated calcined kaolin.

In accordance with a thirteenth aspect of the method dry blend mixture comprises 40% by weight of a UHMW polyethylene having Mw of $1 \times 10^6$, 20% polypropylene block copolymer with melt index of 0.3 and 40% by weight silane-coated calcined kaolin.

In accordance with a fourteenth aspect of the method the dry blend mixture comprises 36% by weight of a UHMW polyethylene having Mw of $3 \times 10^6$, 4% by weight of a UHMW polyethylene having Mw of $3 \times 10^6$ and 60% by weight silane-coated calcined kaolin.

In accordance with a fifteenth aspect of the method the dry blend mixture comprises 42.5% by weight of a UHMW polyethylene having Mw of $5 \times 10^6$, 15% polypropylene block copolymer with melt index of 0.3 and 42.5% by weight silane-coated calcined kaolin.

In accordance with a sixteenth aspect of the method the membrane material is flexible.

BRIEF DESCRIPTION OF THE DRAWINGS

These, and other aspects of the device and method will be better understood by referring to the drawings, in which.

DESCRIPTION IN VIEW OF THE RELEVANT ART

Figure 1:
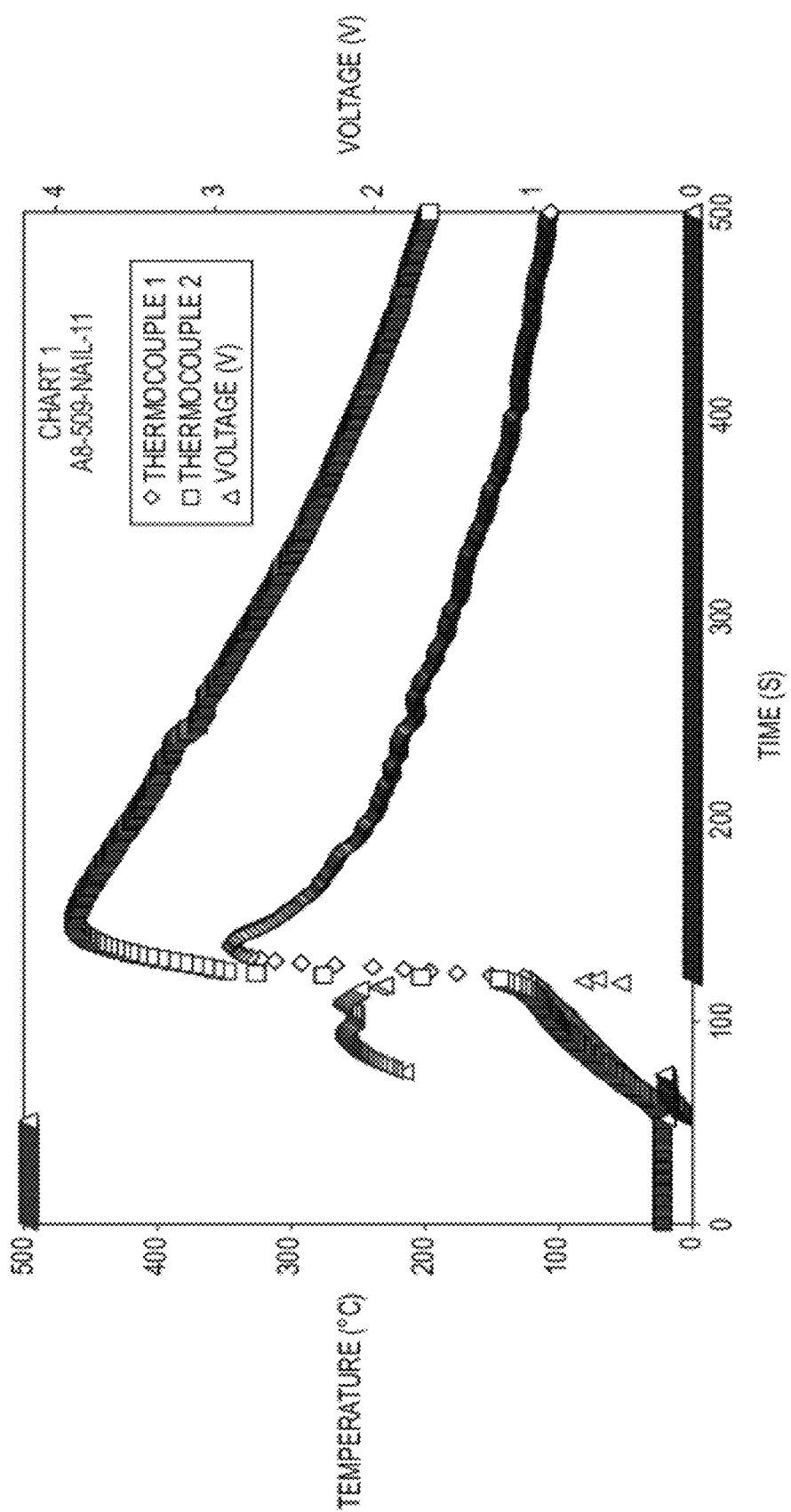
FIG. 1 (Chart 1) depicts the test result of a 18650 lithium cobalt cell made with the separator of current device and method from Example 1.
Figure 2:
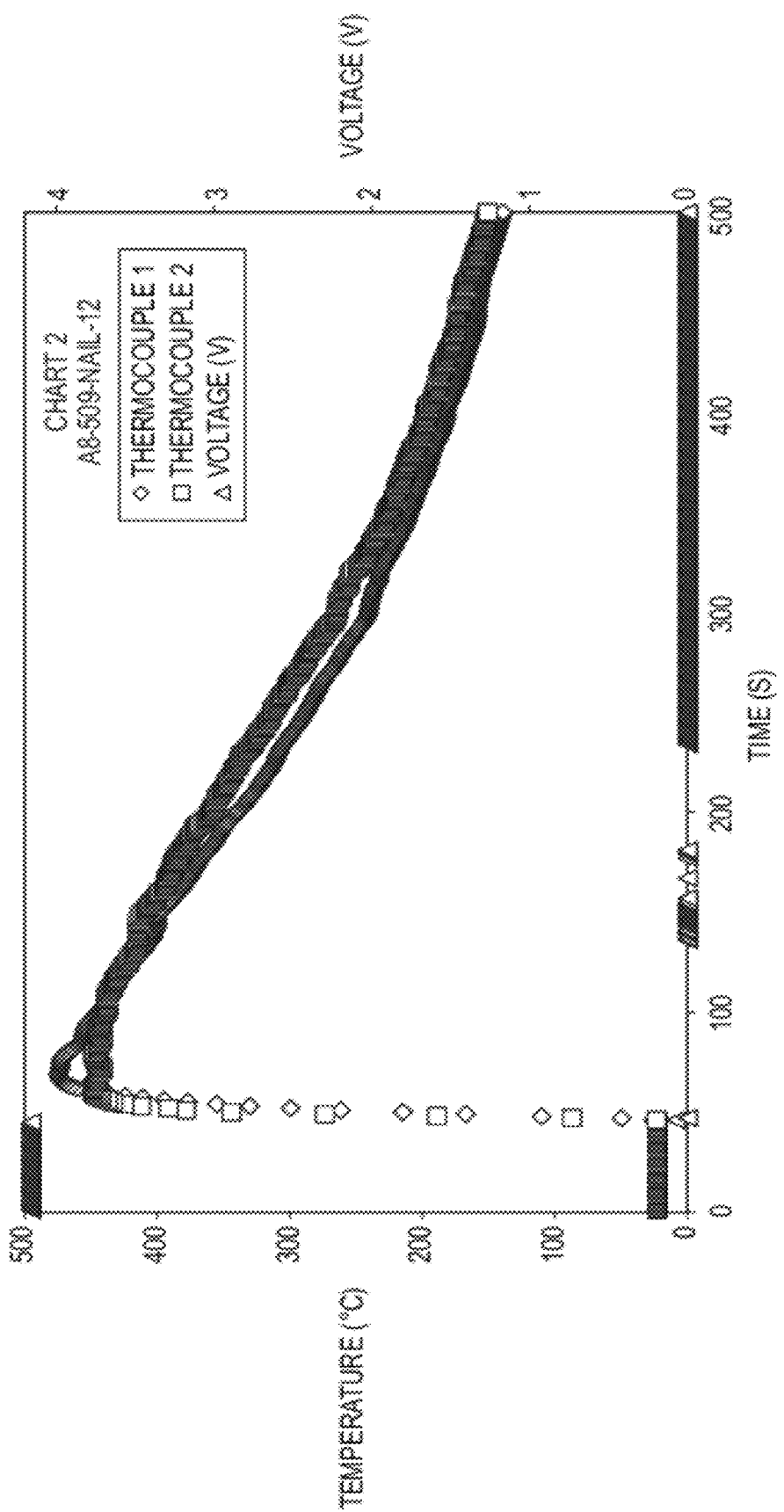
FIG. 2 (Chart 2) depicts a 18650 lithium cobalt cell used as control.
Figure 3:
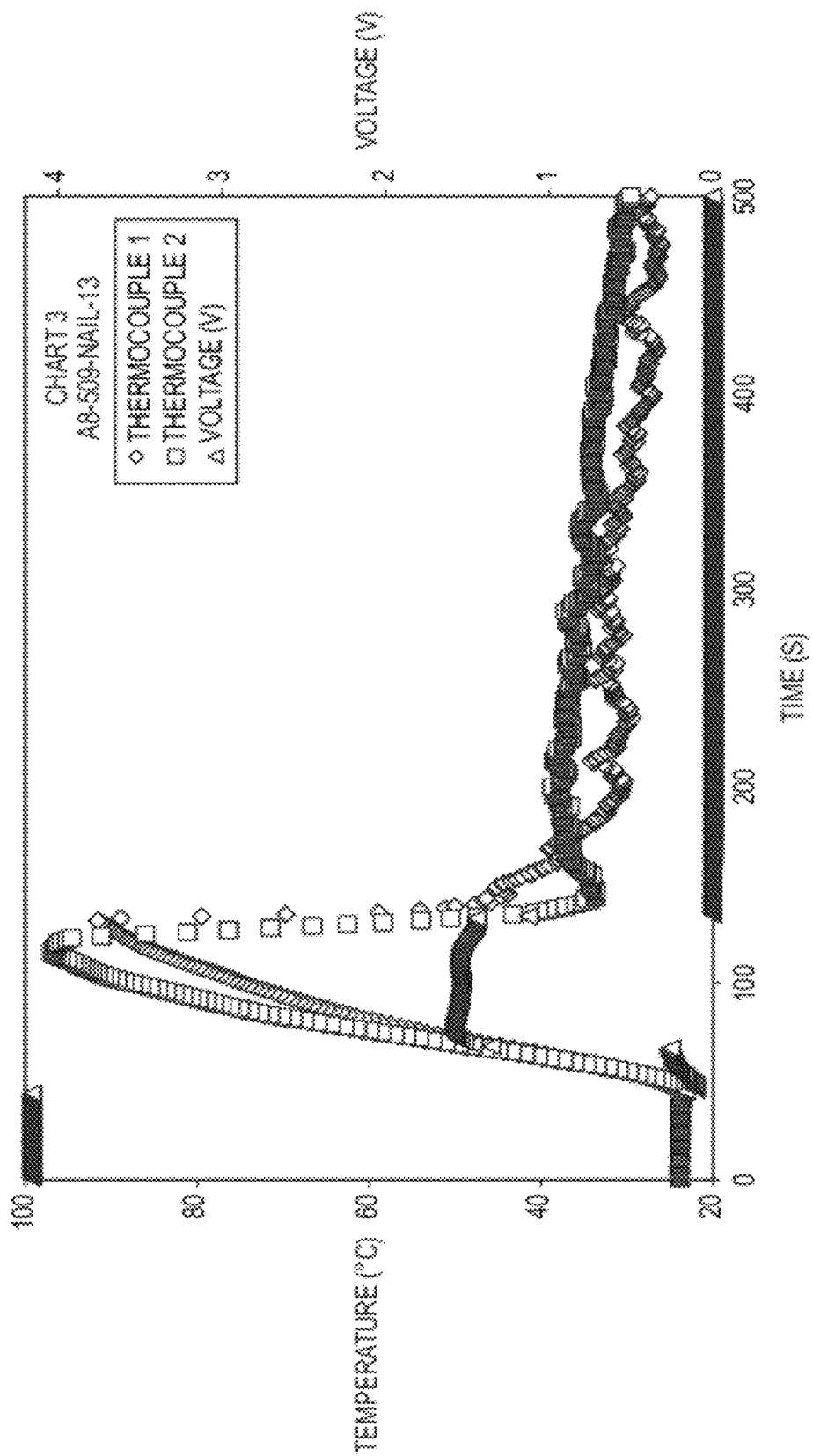
FIG. 3 (Chart 3) depicts the test result of a 18650 lithium cobalt cell made with the separator of current device and method from Example 1.
Figure 4:
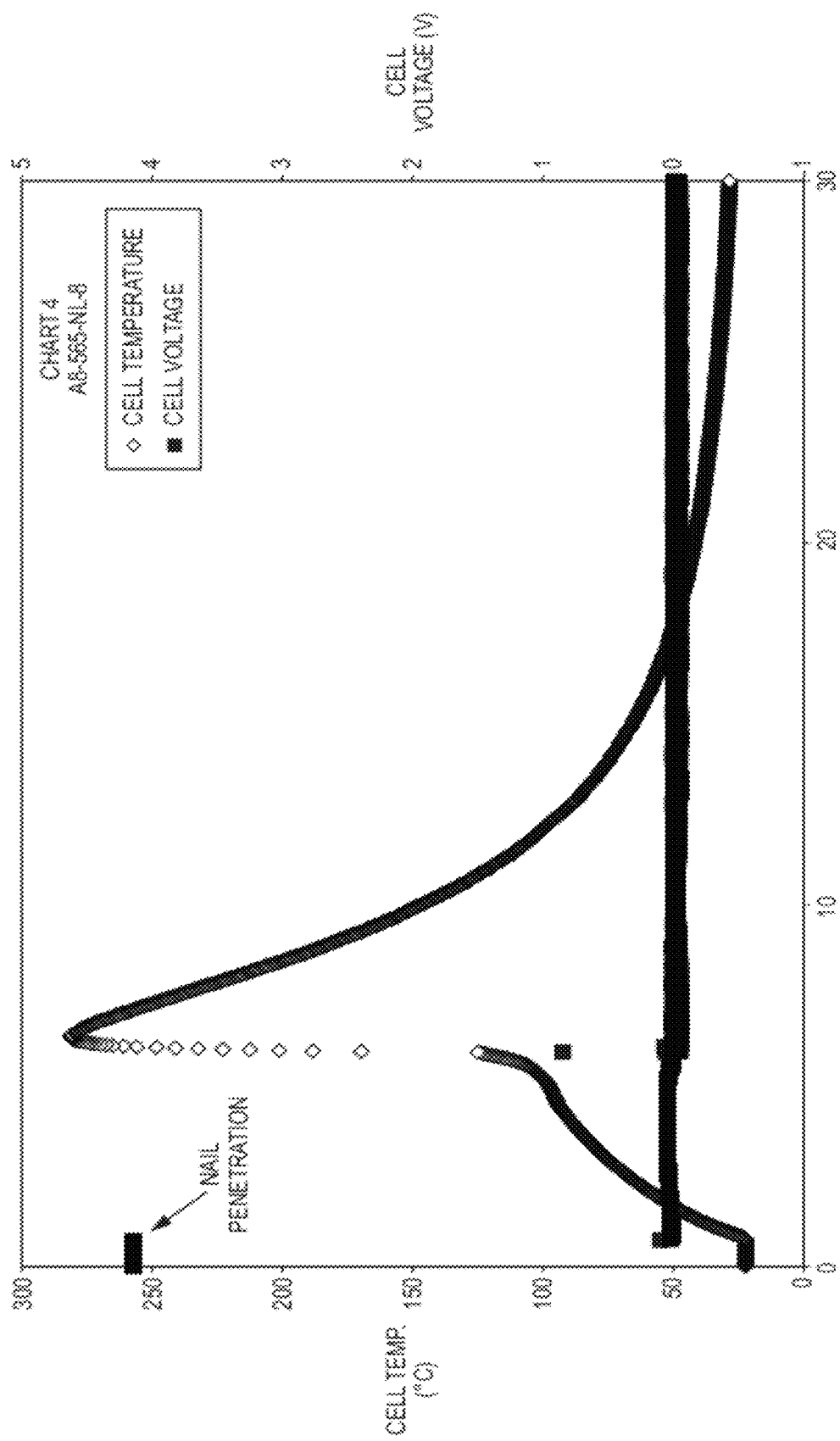
FIG. 4 (Chart 4) depicts the test result of a 18650 lithium cobalt cell made with the separator of current device and method from Example 6.
Figure 5:
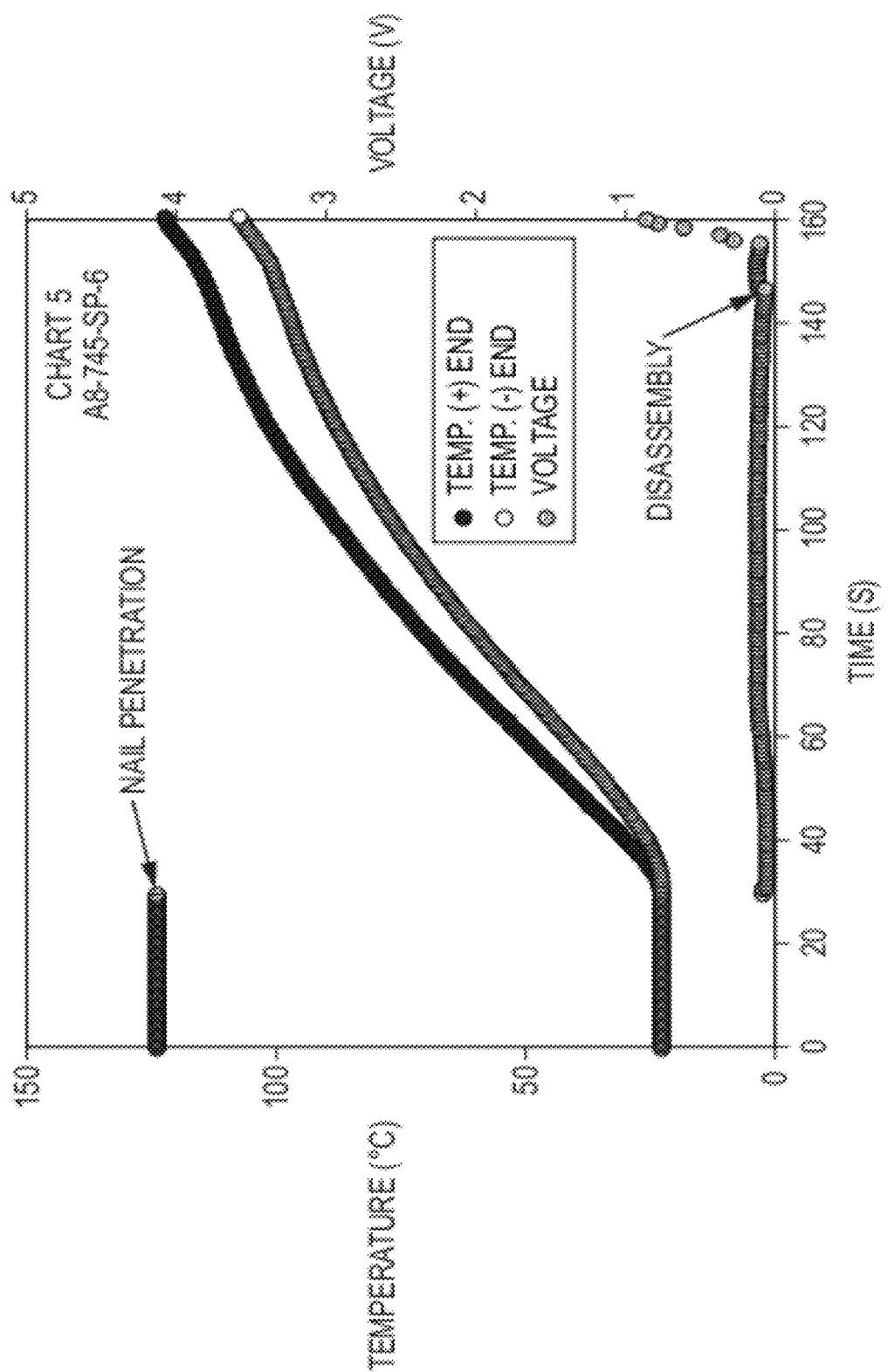
FIG. 5 (Chart 5) depicts the test result of a 18650 lithium cobalt cell made with the separator of current device and method from Example 15.

Although many issues related to safety of lithium ion batteries can be controlled from the outside using Battery Management System (BMS), the issue related to internal short circuit and thermal run away caused by internal short circuit should be addressed and controlled from inside of each cell. Therefore, cell designers have been trying to select or incorporate components or processes which reduces the effect of thermal runaway in the lithium-ion cell in case internal short circuits.

It is well known in the relevant art that lithium can burn and explode when brought into contact with water. As a result, the majority of lithium-ion batteries are filled with a non-aqueous electrolyte to reduce the possibility of burning or explosion. However, unintended rupture of a lithium-ion battery can expose the lithium to water, and even the moisture in the air can cause such a result.

Non-aqueous Lithium ion batteries are the batteries of choice for the new generation electric drive vehicles, however, safety related to internal short circuit (in case of car accidents) is the major concern for all automakers. This has caused extensive costs and delays in launching these new vehicles. A Battery Management System (BMS) can externally control, overcharge, heat management, etc., the only single safety problem in non-aqueous lithium ion batteries that cannot be controlled externally is the internal short circuit. A separator that can address this major safety issue, not to increase the battery assembly costs and also improve the performance of the cells are most desirous. The separator of the current device and method designed to address all of these issues.

The problem of thermal runaway is especially troublesome in the case of lithium-ion batteries used to power electrically-powered or hybrid vehicles, which can cause fires or even explosion as a result of collisions. Tests have shown that puncturing of a typical lithium-ion battery can result in explosions of the batteries within times in the order of seconds. This can be a serious drawback, preventing the widespread use of such vehicles.

In one of the important embodiments of the present device and method, the membrane is flexible, as required by the geometry of the batteries in which the separator is used. The membranes must be flexible in order to be formed into the shapes necessary to function: either cylindrical, or bag-like. The manufacturing techniques for making these separators are an extrusion process, which creates flexible membranes as a result of the nature of the extrusion process and described formulations. The flexibility must be sufficient to bend the membranes described herein into a cylindrical shape, at room temperature, for instance, in a widely used 18650 LIB cell, the cathode, separator and anode are in jellyroll form, fitted into a metallic canister having a diameter of 18 mm and a height of 650 mm.

The current device and method introduces the olefinic microporous membranes or battery separators, specifically designed to limit thermal run-away when used in lithium-ion batteries. A particular formulation of specific elements that incorporates clay minerals in the formulation have been shown by extensive experiments to drastically reduce the severity of thermal runaway in such batteries, and to substantially increase the time between the trauma damaging the battery and the time when the thermal runaway becomes critical. Thus, passengers in the vehicle powered by such a battery are also given sufficient time to exit the vehicle after a collision.

Clay minerals have appeared in battery separators in the past. However, such uses have been generally intended only as a filler, in order to reduce the cost of the separators. Their use in order to reduce thermal runaway has not been known prior to the development of the present device and method by the inventors of this present device and method. Many different approaches have been attempted to solve the serious problem of thermal runaway, but no-one has previously applied the inclusion of clay minerals to solve this problem.

Clay minerals are naturally occurring hydrous aluminum silicates. Clay minerals have sheet like structure and when a tetrahedral silicate layer attached to an octahedral aluminate layer it is referred to 1:1 clays and when an octahedral sheet is sandwiched between two tetrahedral layers, it is referred to 2:1 clays. Kaolinite is an example of 1:1 clay and smectites such as montmorillonite, bentonite, and illite are examples for 2:1 clays. Commercially, kaolinite and bentonite is used as absorbents. Clays are inherently fire retardants and sintered in fire clays were the first form of ceramics. Any clay minerals such as kaolinite or smectites and a combination thereof that contain mostly aluminum oxide and silicon dioxide can be used in the formulation of the microporous membranes of the current device and method and is within the scope of this device and method.

The inventors of the current device and method have chosen Kaolin because it is one of the purest naturally available clays, and therefore the percentages of the component elements can therefore be more precisely controlled. Calcined Kaolin is the preferred choice because there is no water, —OH or Si—OH in its crystalline structure, and therefore more suitable for non-aqueous lithium ion battery environments. Calcined Kaolin is an anhydrous aluminum silicate is produced by heating natural kaolin at temperatures higher than 500 degrees C. Aluminum oxide and silicon dioxide present in calcined kaolin together have roles in inhibiting thermal runaway and improving cell performance. Aluminum oxide ($Al_2O3$) decreases heat transfer, which further reduces the effect of thermal runaway. Silicon dioxide ($SiO2$) absorbs moisture and acts as a moisture-scavenging agent in the cell, thereby further improving the lithium ion cell performance.

In order to improve the bonding between the clay minerals and polymer and to further improve the dispersion of mineral clay in the polymer, a commercially available vinyl silane coated calcined kaolin also incorporated in this device and method, in addition to the calcined kaolin. Any silane coupling agents with PH of 7.0 that is benign to non-aqueous lithium ion cell environment can be used in this device and method. Surface treated calcined kaolin with silane coupling agents improves the dispersion of the filler in the mix and as a result of that a more uniform microporous sheet can be produced.

In order to improve the melt breakdown of the separator of the current device and method a compatible polyolefin with higher melt integrity such as polypropylenes, polypropylene block copolymer or polypropylene random polymer with melt flow index of less than 2, and more preferably less than 1 can be added to the formulation. The more preferred of these polyolefins is polypropylene block copolymer. A block copolymer is a polymer consisting of multiple sequences, or blocks, of the same monomer alternating in series with different monomer blocks and for compatibility their structure can be selected from the available copolymers or customized. The blocks are covalently bound to each other such as AAABBBAAA fashion (A and B are different types of monomers). Block copolymers are classified based on the number of blocks they contain and how the blocks are arranged.

Definitions

As used in this application, a microporous membrane used in a battery separator is defined as "flexible" when any width can be spirally wrapped around a 5 mm diameter shaft without any tearing, cracking, creasing when the film is unwrapped and laid flat.

EXAMPLES OF VIABLE FORMULATIONS

Example 1

A dry-blend consisting of 50% by weight of a UHMW polyethylene having Mw of $1\times10^6$, and 50% by weight of kaolin with density of 2.6 was prepared. The mixture was fed into an extruder. The dry blend mixture was melt-kneaded in the extruder while feeding 60% by weight of liquid paraffin making a solution.

The above solution was extruded from a film die into the form of a sheet. Using a two-roll casting roll, the gel sheet was subsequently cooled down producing a 2 to 4 mil thick gel sheet. The liquid paraffin in the gel sheet was extracted by solvent and dried. The dried microporous sheet was subsequently stretched in both directions at 125° C. for 100% and also heat set at 120° C., producing a 25 microns thick microporous membrane.

The sample produced above was tested for air permeability (Gurley number), shutdown and melt integrity, shrinkage, tensile strength, and puncture resistance. The Gurley number was less than 10 seconds, the sample did not shut down, had a melt integrity more than 190° C., shrinkage of less than 5%, tensile strength of less than 2% offset, and puncture resistance of more than 400 grams. The Gurley number prior to stretching of 2-4 mil (50-200 microns) thick material was measured and it was less than 200 seconds.

Example 2

Except by replacing kaolin with calcined kaolin, the same formulation and procedures of Example 1 were repeated to obtain a microporous membrane.

We noticed that the oil dispersion of calcined kaolin is better than kaolin. The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, offset of less than 2% at 1000 psi which is an indication of high tensile strength (>1000 Kg/cm2), puncture resistance of more than 450 grams. The Gurley number prior to stretching of 2-4 mil (50-200 microns) thick material was measured and it was less than 200 seconds.

Example 3

Except for using a dry blend mixture of 40% by weight of a UHMW polyethylene having Mw of $1\times10^6$, 10% by weight of a UHMW polyethylene having Mw of $3\times10^6$ and 50% by weight calcined kaolin, the same procedures of Example 1 were repeated to obtain a microporous membrane.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 480 grams. The Gurley number prior to stretching of 2-4 mil (50-200 microns) thick material was measured and it was less than 200 seconds.

Example 4

Except for using a dry blend mixture of 20% by weight of a UHMW polyethylene having Mw of $1\times10^6$, and 80% by weight calcined kaolin, the same procedures of Example 1 were repeated to obtain a microporous membrane.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 200 grams. The Gurley number prior to stretching of 2-4 mil (50-200 microns) thick material was measured and it was less than 200 seconds.

Example 5

Except for using a dry blend mixture of 80% by weight of a UHMW polyethylene having Mw of $1\times10^6$, and 20% by weight calcined kaolin, the same procedures of Example 1 were repeated to obtain a microporous membrane.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 800 grams. The Gurley number prior to stretching of 2-4 mil (50-200 microns) thick material was measured and it was less than 200 seconds.

Example 6

Except for using a dry blend mixture of 40% by weight of a UHMW polyethylene having Mw of $1\times10^6$, 20% PP with melt index of less than 2 and 40% by weight calcined kaolin, the same procedures of Example 1 were repeated with a different process conditions. The dried microporous sheet was subsequently stretched in both directions at 140° C. for 100% and also heat set at 135° C., producing a 25 microns thick microporous membrane.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 550 grams. The Gurley number prior to stretching of 2-4 mil (50-200 microns) thick material was measured and it was less than 200 seconds.

Example 7

Except for using a dry blend mixture of 50% by weight of a UHMW polyethylene having Mw of $3\times10^6$, and 50% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 5%, tensile strength of less than 2% offset, puncture resistance of more than 500 grams. The Gurley number prior to stretching of 2-4 mil (50-200 microns) thick material was measured and it was less than 200 seconds.

Example 8

Except for using a dry blend mixture of 50% by weight of a UHMW polyethylene having Mw of $5\times10^6$, and 50% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample did not shutdown, had a melt integrity more than 190° C., shrinkage of less than 50, tensile strength of less than 20 offset, puncture resistance of more than 600 grams. The Gurley number prior to stretching of 2-4 mil (50-200 microns) thick material was measured and it was less than 200 seconds.

Example 9

Except for using a dry blend mixture of 50% by weight of a UHMW polyethylene having Mw of 5×10$^6$, 40% by weight of a UHMW polyethylene having Mw of about 800,000 and 10% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample shutdown at 146° C., had a melt integrity more than 190° C., shrinkage of less than 5%, tensile strength of less than 2% offset, puncture resistance of more than 550 grams. The Gurley number prior to stretching of 2-4 mil (50-200 microns) thick material was measured and it was less than 200 seconds.

Example 10

Except for using a dry blend mixture of 40% by weight of a UHMW polyethylene having Mw of 5×10$^6$, 40% by weight of a UHMW polyethylene having Mw of about 300,000 and 20% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample shutdown at 135° C., had a melt integrity more than 190° C., shrinkage of less than 5%, tensile strength of less than 2% offset, puncture resistance of more than 500 grams. The Gurley number prior to stretching of 2-4 mil (50-200 microns) thick material was measured and it was less than 200 seconds.

Example 11

Except for using a dry blend mixture of 25% by weight of a UHMW polyethylene having Mw of 5×10$^6$, 70% by weight of a UHMW polyethylene having Mw of about 300,000 and 5% by weight calcined kaolin, the same procedures of Example 1 were repeated.

The sample produced above was tested for air permeability (Gurley number), shutdown and melt integrity, shrinkage, tensile strength, and puncture resistance. The Gurley number was less than 10 seconds, the sample shutdown at 131° C., had a melt integrity more than 190° C., shrinkage of less than 5%, tensile strength of less than 2% offset, puncture resistance of more than 500 grams. The Gurley number prior to stretching of 2-4 mil (50-200 microns) thick material was measured and it was less than 200 seconds.

These first eleven examples are summarized in the table appearing below as Table 1.

TABLE 1

| FORMULATION | EXAMPLES | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| UHMWPE Mwt > 1million | 50% | 50% | 40% | 20% | 80% | 40% |  |  |  |  |  |
| UHMWPE Mwt > 3million |  |  | 10% |  |  |  | 50% |  |  |  | 25% |
| UHMWPE Mwt > 5million |  |  |  |  |  |  |  | 50% | 50% | 40% |  |
| Polypropylene |  |  |  |  |  | 20% |  |  |  |  |  |
| HDPE Mwt 800000 |  |  |  |  |  |  |  |  | 40% |  |  |
| HDPE Mwt 300000 |  |  |  |  |  |  |  |  |  | 40% | 70% |
| Kaolin | 50% |  |  |  |  |  |  |  |  |  |  |
| Calcined Kaolin |  | 50% | 50% | 80% | 20% | 40% | 50% | 50% | 10% | 20% | 5% |
| PROPERTIES |  |  |  |  |  |  |  |  |  |  |  |
| Thickness (microns) | 25 | 25 | 25 | 25 | 25 | 25 | 25 | 25 | 25 | 25 | 25 |
| Gurley (sec) | <10 | <10 | <10 | <10 | <10 | <10 | <10 | <10 | <10 | <10 | <10 |
| Shrinkage MD % | <5 | <5 | <5 | <5 | <5 | <5 | <5 | <5 | <5 | <5 | <5 |
| Shrinkage TD % | <5 | <5 | <5 | <5 | <5 | <5 | <5 | <5 | <5 | <5 | <5 |
| Shutdown Deg. C. | None | None | None | None | None | None | None | None | 148 | 135 | 131 |
| Melt Integrity Deg. C. | >190 | >190 | >190 | >190 | >190 | >190 | >190 | >190 | >190 | >190 | >190 |
| Puncture grams | >400 | >450 | >480 | >200 | >800 | >550 | >500 | >600 | >550 | >500 | >500 |
| Tensile % offset at 1000 psi | <2% | <2% | <2% | <2% | <2% | <2% | <2% | <2% | <2% | <2% | <2% |

Test Methods

The following test methods previously used for measurements in Table 1 are used for the measurements in the new examples in Table 2:

Thickness—Thickness (mil or micron)—is determined using a precision micrometer.

Air permeability—measured by using a Gurley densometer (Model 4120), ASTM-D726(B)—Gurley is the time in seconds required to pass 10 cc of air through one square inch of product under a pressure of 12.2 inches of water.

Shutdown—measured using the method described by Spotnitz, et al., "Shutdown Battery Separators", the 12$^{th}$ Intl. Sem. Primary of Secondary Battery Technology and Applications, 1995.

Shrinkage—measured in both directions after 60 min at 90° C.

Tensile—calculated in machine direction by measuring percent offset at 1000 psi.

To better simulate cell environments, the following test methods has been modified and utilized for measurements in the new examples:

Melt integrity—measured using a picture frame type clamping fixture, securing the membrane (3"×5") in the fixture and placing the picture frame in a precision oven, raising the oven temperature at a rate of approximately 5 degrees C. per minute until the membrane starts melting. The onset of melting temperature (usually initiates with a small hole in the membrane) was recorded as the melt integrity of the membrane.

Puncture—measured by pressing a cylindrical pin (1 mm diameter) with a hemispherical tip through a sample. The maximum load occurring is a measure of the puncture resistance.

Example 12

A dry-blend consisting of 45% by weight of a UHMW polyethylene having average Mw of $1 \times 10^6$, 5% by weight by weight of UHMW polyethylene having average Mw of $5 \times 10^6$ and 50% by weight Calcined Kaolin with density of 2.6 was prepared. The mixture was fed into an extruder. The dry blend mixture was melt-kneaded in the extruder while feeding 60% by weight of mineral oil making a solution.

The above solution was extruded from a T-die into the form of a sheet. Using a two-roll casting roll, the gel sheet was subsequently cooled down producing a 30 mil (0.750 mm) thick gel sheet. The gel sheet was stretched wet 6 times in both directions at 120-130 degrees C. (machine and transverse directions using a biaxial stretching equipment) resulting a 20 micron thick gel sheet. The mineral oil in the gel sheet was extracted by a solvent and dried, the film subsequently heat set at 125-130 degrees C. producing a microporous membrane.

The sample produced above was tested for air permeability (Gurley), shutdown and melt integrity, shrinkage, tensile, and puncture. The results are shown in Table 2.

Example 13

Except for using a dry blend mixture of 45% by weight of a UHMW polyethylene having Mw of $1 \times 10^6$, 5% by weight of a UHMW polyethylene having Mw of $3 \times 10^6$ and 50% by weight calcined kaolin, the same procedures of Example 12 were repeated to obtain a microporous membrane.

Example 14

Except for using a dry blend mixture of 25% by weight of a UHMW polyethylene having Mw of $1 \times 10^6$, and 75% by weight silane coated calcined kaolin, the same procedures of Example 12 were repeated to obtain a microporous membrane.

Example 15

Except for using a dry blend mixture of 45% by weight of a UHMW polyethylene having Mw of $1 \times 10^6$, 5% by weight of a UHMW polyethylene having Mw of $3 \times 10^6$ and 50% by weight silane-coated calcined kaolin, the same procedures of Example 12 were repeated to obtain a microporous membrane.

Example 16

Except for using a dry blend mixture of 40% by weight of a UHMW polyethylene having Mw of $1 \times 10^6$, 20% polypropylene block copolymer with melt index of 0.3 and 40% by weight silane-coated calcined kaolin, the same procedures of Example 12 were repeated with different stretching and heat setting conditions, stretched at 140 and heat set at 135 degrees C. producing a 25 microns thick microporous membrane.

Example 17

Except for using a dry blend mixture of 36% by weight of a UHMW polyethylene having Mw of $3 \times 10^6$, 4% by weight of a UHMW polyethylene having Mw of $3 \times 10^6$ and 60% by weight silane-coated calcined kaolin, the same procedures of Example 12 were repeated.

Example 18

Except for using a dry blend mixture of 42.5% by weight of a UHMW polyethylene having Mw of $5 \times 10^6$, 15% polypropylene block copolymer with melt index of 0.3 and 42.5% by weight calcined kaolin, the same procedures of Example 16 were repeated.

Example 19

Except for using a dry blend mixture of 42.5% by weight of a UHMW polyethylene having Mw of $5 \times 10^6$, 15% polypropylene block copolymer with melt index of 0.3 and 42.5% by weight silane coated calcined kaolin, and using paraffinic oil, the same procedures of Example 16 were repeated.

This second set of examples, beginning with Example 12, is summarized in Table 2.

TABLE 2

| Formulation | EXAMPLES | | | | | | | |
|---|---|---|---|---|---|---|---|---|
| | 12 | 13 | 14 | 15 | 16 | 17 | 18 | 19 |
| Roll ID # | H0301-1 | E0411-1 | H0308-1 | H0411-1 | H0414-1 | H0307-1 | F0202-1 | H0803 |
| UHMWPE Mwt > 1million | 45% | 45% | 25% | 45% | 40% | 36% | 42.5% | 42.5% |
| UHMWPE Mwt > 3million | | 5% | | | | 4% | | |
| UHMWPE Mwt > 5million | 5% | | | 5% | | | | |
| PP block copolymer | | | | | 20% | | 15% | 15% |
| Coated Calcined Kaolin | | | 75% | 50% | 40% | 60% | | 42.5% |
| Calcined Kaolin | 50% | 50% | | | | | 42.5% | |
| Properties | | | | | | | | |
| Thickness (microns) | 22 | 25 | 25 | 22 | 22 | 22 | 20 | 20 |
| Gurley (sec/10 cc) | 3.2 | 5.2 | 2.4 | 8.4 | 27.5 | 5.2 | 25 | 10.5 |
| Shrinkage MD % | <3 | <3 | <3 | <5 | <5 | <3 | <3 | <3 |
| Shrinkage TD % | <1 | <2 | <1 | <1 | <1 | <1 | <2 | <1 |
| Shutdown Deg. C. | None | None | None | None | None | None | None | None |
| Melt Integrity Deg. C. | 160 | 161 | 162 | 162 | 188 | 160 | 181 | 188 |
| Puncture grams (1 mm pin) | 240 | 300 | 130 | 260 | 240 | 160 | 210 | 220 |
| Tensile % offset at 1000 psi | 2 | 3.5 | 4.1 | 1.9 | 2.3 | 5 | 2.5 | 1.9 |

To verify the safety behavior of separators made by the new device and method in non-aqueous lithium ion cells, 2 rolls of materials produced according to Example 1 was sent to a lithium ion battery company California (Farasis, Inc.) to build cells for comparison tests. The most commercially available cell configuration and chemistry called 18650 (spirally wound cylindrical lithium ion cobalt cells) were used for performance and safety tests. Using their standard assembly procedures, Farasis built several 18650 cells using their own standard cathodes, anodes, electrolytes (very similar to all commercially available lithium ion cell components) and the separator of the current device and method. They also made several control 18650 cells using their standard components. In the control cells, Farasis used a commercially available separator (Tri-layer Celgard 2023). These cells are usually rated approximately 2 AH and 3-4 volts. The cells made with the separator of current device and method and control cells were shipped to Mobile Power Solutions, Inc. (MPS) in Oregon for abuse and performance tests. MPS performed cycle performance and several abuse tests such as overcharge, impact and nail penetration test on these samples. The cell made with the separator of current device and method met or exceeded all of the performance and safety requirements. For this device and method the focus of inventors were primarily to address the safety improvements related in case of internal short circuit.

One of the most important safety tests for lithium ion batteries is a test that can simulate internal short circuit of a non-aqueous lithium ion cell. The nail penetration test is used to simulate this phenomenon.

The following charts show the temperature profile (using the average reading of two thermocouples attached to the cell) of four cells after nail penetration:

Chart 1

A8-509-NAIL-11—is the test result of a 18650 lithium cobalt cell made with the separator of current device and method from Example 1, using Farasis standard 18650 cell design which included a PTC (positive temperature control) chip.

Result: In A8-509-NAIL-11 Chart 1, the temperature profile (also a video of this test) shows that nail penetrates the cell nothing happens for about 60 seconds. After 60 seconds the temperature starts going up, the cell vents and then goes to thermal runaway. There was electrolyte leakage, smoke and delayed venting. No sparks or flame were detected. This delay in thermal runaway is due to thermal behavior of the calcined kaolin (which acts as a fire retardant).

Chart 2

A8-509-NAIL-12—is a 18650 lithium cobalt cell used as control. It was made with tri-layer Celgard-2320 separator using Farasis' standard 18650 cell design which also included a PTC chip.

Result: In A8-509-NAIL-12 Chart 2, the temperature profile (also a video of this test) shows that as soon as nail penetrates the cell, there is an immediate explosion (thermal runaway) with no delays.

Chart 3

A8-509-NAIL-13 Chart 3 is the test result of a 18650 lithium cobalt cell made with the separator of current device and method from Example 1, using Farasis standard 18650 cell design. To see the role of PCT chip in internal short circuit, we requested Farasis to make this cell without a PTC chip.

Result: In A8-509-NAIL-13 chart Chart 3 the temperature profile (also a video of this test) also shows that when nail penetrates the cell, the cell temperature goes up slowly for about 60 seconds. After 60 seconds the thermocouples start detaching from the cell and cooling down, however the video of this test showed that the cell vents and then goes to thermal runaway. There was electrolyte leakage and delayed venting. No sparks or flames were detected. Again, this delay in thermal runaway is due to thermal behavior of the calcined kaolin (which acts as a fire retardant). We concluded that the PTC chip in 18650 cells has no affect whatsoever in case of internal short circuit.

Chart 4

A8-565-NL-8—is the test result of a 18650 lithium cobalt cell made with the separator of current device and method from Example 6. This membrane contains polypropylene in the formulation (two rolls of this materials were sent to Farasis and they made several cells and sent them to MPS for testing). Same standard 18650 cell design which included a PTC (positive temperature control) chip was used to build these cells.

Result: In A8-565-NL-8 chart Chart 4 the temperature profile (also a video of this test) shows that when the nail penetrates the cell nothing happens for about 5 minutes. After 5 minutes the temperature started going up, the cell vents and then goes to thermal runaway. This five minute delay in thermal runaway is due to combination of thermal behavior of the calcined kaolin (which acts as a fire retardant) and presence of a polyolefin which has higher melt integrity.

Chart 5

A8-745-SP-6—is the test result of a 18650 lithium cobalt cell made with the separator of current device and method from Example 15, using Farasis standard 18650 cell design which included a PTC (positive temperature control) chip.

Result: In A8-745-SP-6 Chart 5 the temperature profile (also a video of this test) also shows that when the nail penetrates the cell temperature goes up slowly for about 60 seconds. After 60 seconds the thermocouples start detaching from the cell and cooling down, however the video of this test showed that the cell vents and then goes to thermal runaway. Again, this delay in thermal runaway is due to thermal behavior of the calcined kaolin (which acts as a fire retardant). We concluded that using different processing steps does not affect the effect of calcined kaolin as a fire retardant in the membrane.

The A8-745-SP-6 was fully penetrated (initial speed 250 mm/sec.) midway down the long axis with a 3 mm dia, steel nail. The ambient temperature was 22° C. Two thermocouples were attached to the cell, one nearer the (+) terminal and one nearer the (−) terminal. The voltage dropped and the cell heated upon nail penetration. The nail created an internal short circuit. The cell vented 108 seconds after penetration. Disassembly occurred 117 seconds after penetration with sparks. A jelly roll was ejected through the header.

Figure 6:
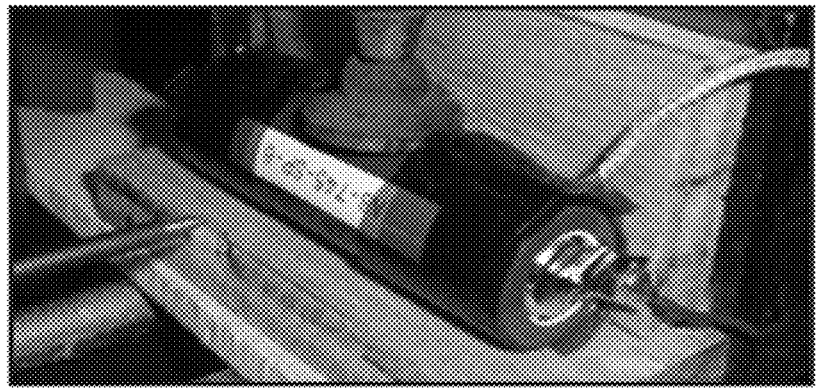
FIG. 6 shows a pre-test set-up for a lithium-ion battery prior to nail penetration.

Referring to FIG. 6, the pre-test set-up is shown for the A8-745-SP-6 prior to nail penetration. The calibrated equipment that was used during nail penetration is listed in FIG. 6 alone with the time of the vent and disassembly events after nail penetration.

In addition to the Charts 1-5 in FIGS. 1-5, the videos from the nail penetration tests show that the 18650 cells made with the separator of current device and method delayed thermal runaway and venting up to 60 seconds or more. The nail penetration test shows that the control cell (18650 cell made with tri-layer Celgard-2320) exploded (thermal runaway occurs) immediately after nail penetrates the cell.

The above nail penetration test results indicate that there are major safety benefits by incorporating a clay mineral in the formulation of the polyolefin based separators. In addition to safety, due to high oil absorption properties of clays in the formulation the separators of current device and method has higher porosity, better wettability and wicking properties, which usually translates to lower electrical resistance and better performance in a cell.

The weight percentage of the clays in the formulation of the current device and method will determine the level of safety protection, porosity, tensile strength, puncture, shrinkage, wettability and wicking behavior of the separator. If the weight percentage of the clay mineral in the formulation is 20% or less there is no significant safety benefits however the separator may shows shutdown behavior. If the weight percentage of the clay mineral in the formulation is 80% or more, the safety with respect to internal short circuit will be improved, i.e., after nail penetration, it should take longer time before cell starts venting, however, other required properties such as adequate tensile and puncture strength will not be achieved. Therefore, the weight percentage of the clay in the formulation should be between 20 to 80 or more preferably not less than 40 or more than 60.

While the invention has been described in detail and with reference to specific embodiments thereof, it will be apparent to one skilled in the art that various changes and modifications can be made therein without departing from the spirit and scope thereof.

We claim:

1. A method for manufacturing a microporous membrane as a battery separator for use in a lithium-ion battery containing a non-aqueous electrolyte, the battery separator therefore being resistant to thermal runaway and without shutdown, the method comprising the steps of:
   (a) preparing a dry-blend comprising 45% by weight of a first ultra high molecular weight (UHMW) polyethylene having an average molecular weight (Mw) of $1 \times 10^6$, 5% by weight of a second UHMW polyethylene having an average Mw of $3 \times 10^6$ and 50% by weight calcined kaolin to form a dry-blend mixture;
   (b) feeding the dry-blend mixture into an extruder;
   (c) melt-kneading the dry-blend mixture into an extruder while feeding 60% by weight of plasticizer into the dry-blend mixture, making a solution thereby;
   (d) extruding the solution into the form of a sheet;
   (e) cooling the sheet down to form a gel sheet;
   (f) wet-stretching the gel sheet in both machine and transverse directions to produce a stretched gel sheet containing the plasticizer;
   (g) extracting the plasticizer from the stretched gel sheet and drying the stretched gel sheet to form a film; and
   (h) heat setting the film to form the microporous membrane having no shutdown temperature.

2. The method of claim 1, wherein the calcined kaolin is a silane-coated calcined kaolin.

3. The method of claim 1, wherein the step of melt-kneading the dry-blend mixture in the extruder while feeding 60% by weight of the plasticizer includes the step of providing the plasticizer from one of a group consisting of mineral oil, white mineral oil and liquid paraffin.

4. A method for manufacturing a microporous membrane as a battery separator for use in a lithium-ion battery containing a non-aqueous electrolyte, the battery separator therefore being resistant to thermal runaway and without shutdown, the method comprising the steps of:
   (a) preparing a dry-blend comprising 45% by weight of a first ultra high molecular weight (UHMW) polyethylene having an average molecular weight (Mw) of $1 \times 10^6$, 5% by weight of a second UHMW polyethylene having an average Mw of $5 \times 10^6$ and 50% by weight calcined kaolin to form a dry-blend mixture;
   (b) feeding the dry-blend mixture into an extruder;
   (c) melt-kneading the dry-blend mixture into an extruder while feeding 60% by weight of plasticizer into the dry-blend mixture, making a solution thereby;
   (d) extruding the solution into the form of a sheet;
   (e) cooling the sheet down to form a gel sheet;
   (f) wet-stretching the gel sheet in both machine and transverse directions to produce a stretched gel sheet containing the plasticizer;
   (g) extracting the plasticizer from the stretched gel sheet and drying the stretched gel sheet to form a film; and
   (h) heat setting the film to form the microporous membrane having no shutdown temperature.

5. The method of claim 4, wherein the calcined kaolin is a silane-coated calcined kaolin.

6. The method of claim 4, wherein the step of melt-kneading the dry-blend mixture in the extruder while feeding 60% by weight of the plasticizer includes the step of providing the plasticizer from one of a group consisting of mineral oil, white mineral oil and liquid paraffin.

* * * * *